(12) United States Patent
Hsu

(10) Patent No.: US 6,804,898 B1
(45) Date of Patent: Oct. 19, 2004

(54) TAPE RULE MARKING IMPLEMENT

(76) Inventor: Cheng-Hui Hsu, Taipei Hsien (TW)

(*) Notice: Subject to any disclaimer, the term of this patent is extended or adjusted under 35 U.S.C. 154(b) by 0 days.

(21) Appl. No.: 10/731,128

(22) Filed: Dec. 10, 2003

(51) Int. Cl.$^7$ ................................................ B25H 7/04
(52) U.S. Cl. ........................................ 33/668; 33/770
(58) Field of Search ...................... 33/668, 770, 759, 33/755, 760, 768, 27.03, 27.031, 27.032

(56) References Cited

U.S. PATENT DOCUMENTS

| | | | | |
|---|---|---|---|---|
| 2,065,143 A | * | 12/1936 | Metcalf | 33/27.032 |
| 3,262,211 A | * | 7/1966 | Beckett | 33/668 |
| 3,336,678 A | * | 8/1967 | Chamberlain et al. | 33/668 |
| 4,630,376 A | * | 12/1986 | Pentecost | 33/760 |
| 4,642,899 A | * | 2/1987 | Fass et al. | 33/760 |
| 4,760,648 A | * | 8/1988 | Doak et al. | 33/668 |
| 5,671,543 A | * | 9/1997 | Sears | 33/668 |
| 6,167,628 B1 | * | 1/2001 | Jones et al. | 33/27.03 |
| 6,223,443 B1 | * | 5/2001 | Jacobs | 33/27.03 |
| 6,574,881 B2 | * | 6/2003 | Cole, III | 33/668 |
| 6,725,560 B2 | * | 4/2004 | Smith | 33/668 |

* cited by examiner

Primary Examiner—Diego Gutierrez
Assistant Examiner—Amy R. Cohen
(74) Attorney, Agent, or Firm—Rosenberg, Klein & Lee

(57) ABSTRACT

A tape rule marking implement in which a support member is additionally mounted on the ruler blade output opening at the front end of a tape rule, with a marking implement installed at the corner at one side of its anterior extremity, thereby providing for convenient marking when measurements are taken as well as higher practical value.

1 Claim, 3 Drawing Sheets

TAPE RULE MARKING IMPLEMENT

BACKGROUND OF THE INVENTION

1) Field of the Invention

The invention herein relates to tape rule accessories, specifically a tape rule marking implement in which a support member is additionally mounted on the ruler blade output opening at the front end of a tape rule and a marking implement is installed on the corner at one side of its anterior extremity, thereby providing for convenient marking when measurements are taken as well as higher practical value.

2) Description of the Prior Art

When a conventional tape rule is used for taking measurements, the ruler blade of the tape rule is pulled out. If the user wants to indicate a certain measured position on the ground, wall, or other object surface, one hand typically maintains the tape rule in place, while other hand marks the appropriate point, resulting in inconvenient tape rule measuring. To enable more convenient tape rule utilization, the applicant of the invention herein conducted extensive research and development based on years of experience gained while engaged in the relevant industries, which following repeated testing and refinement culminated in the completion of the tape rule marking implement of the invention herein.

SUMMARY OF THE INVENTION

The primary objective of the invention herein is to provide a tape rule marking implement in which a support member is additionally mounted on the ruler blade output opening at the front end of a tape rule and a marking implement is installed on the corner at one side of its anterior extremity, thereby providing for convenient marking when measurements are taken, added tape rule application flexibility, and higher practical value.

To enable the examination committee a further understanding of the structural features, content, and advantages of the invention herein, the brief description of the drawings below are followed by the detailed description of the invention.

DETAILED DESCRIPTION OF THE INVENTION

Figure 1:
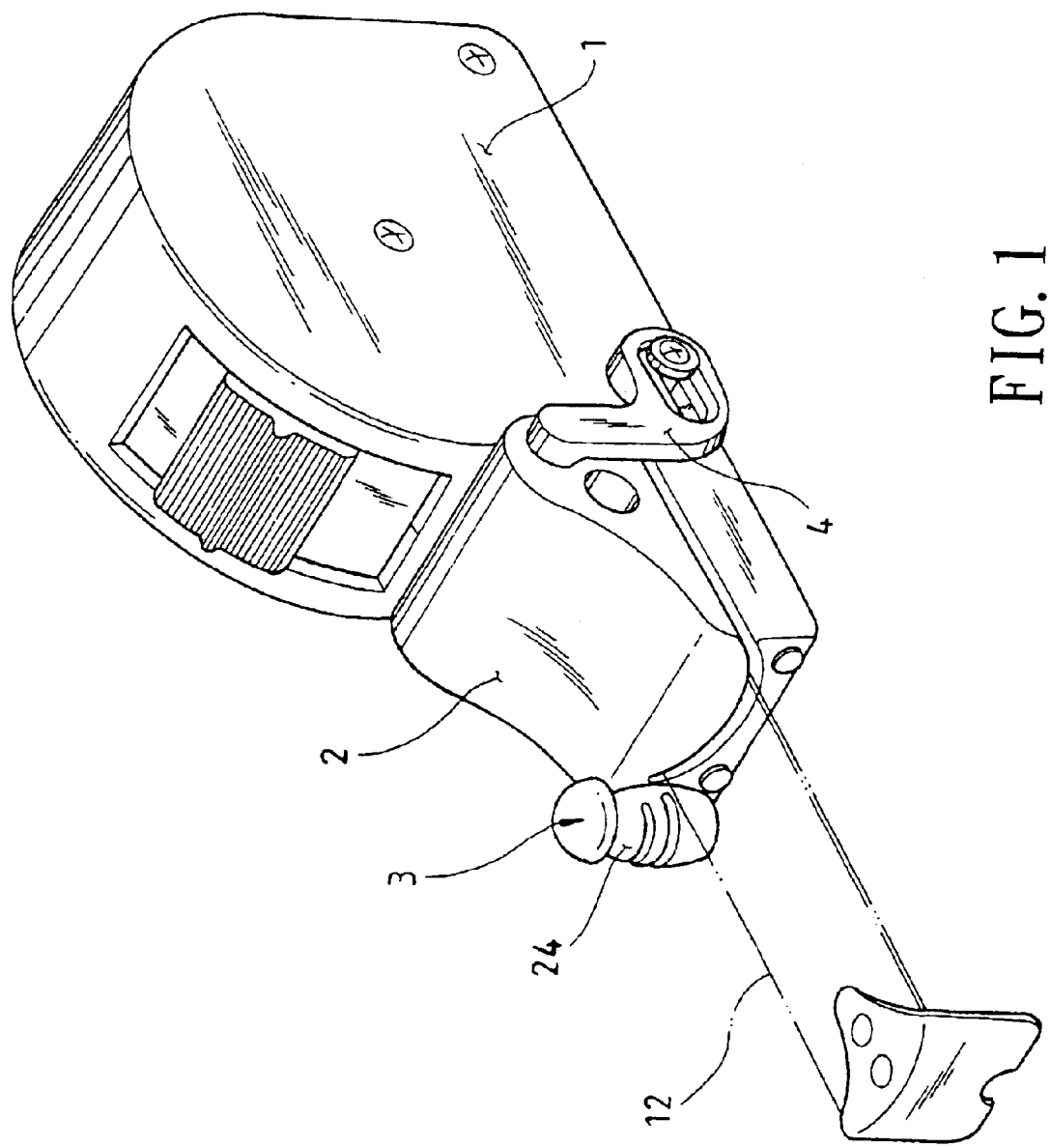
FIG. 1 is an isometric drawing of the invention herein.
Figure 2:
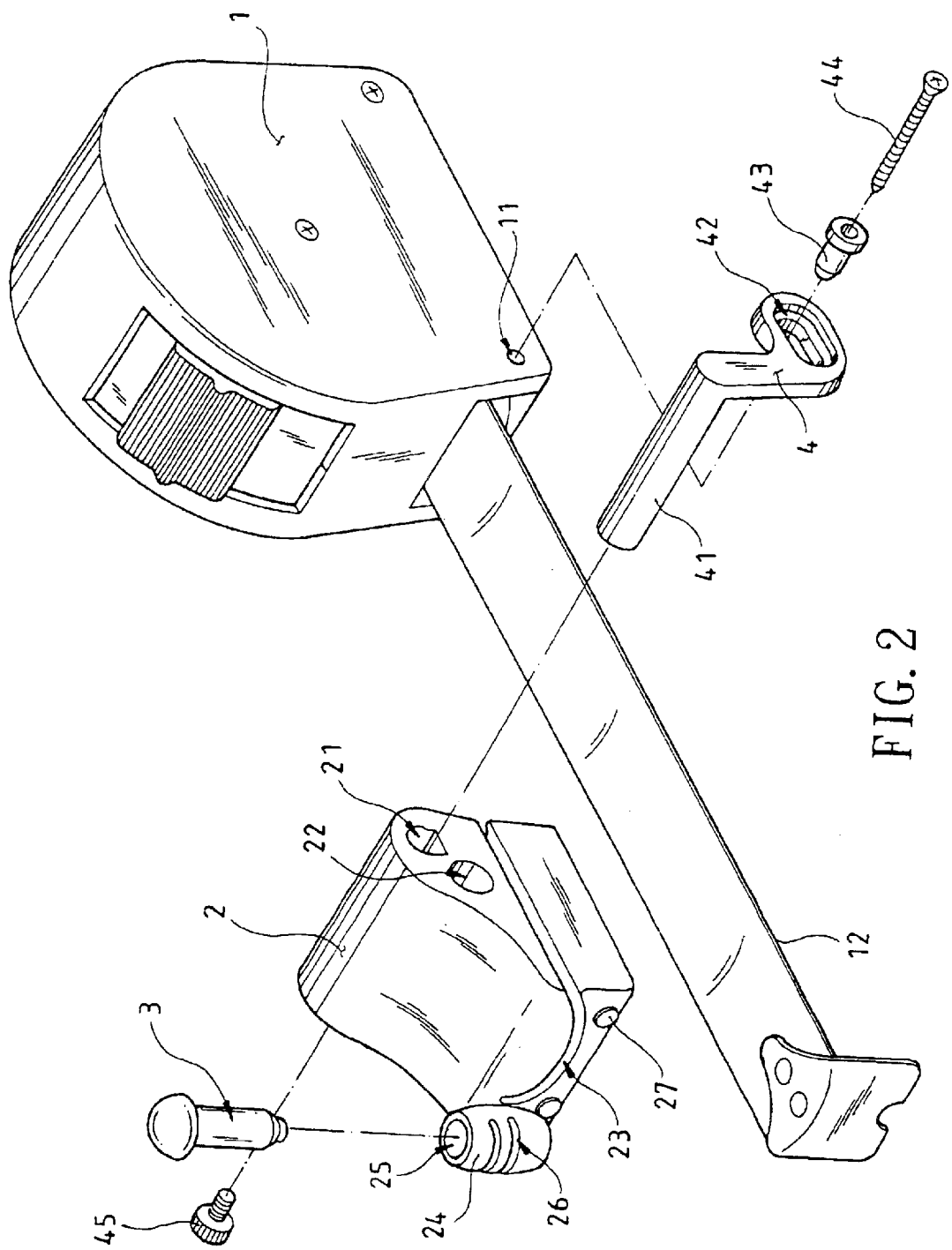
FIG. 2 is an exploded drawing of the invention herein.
Figure 4:
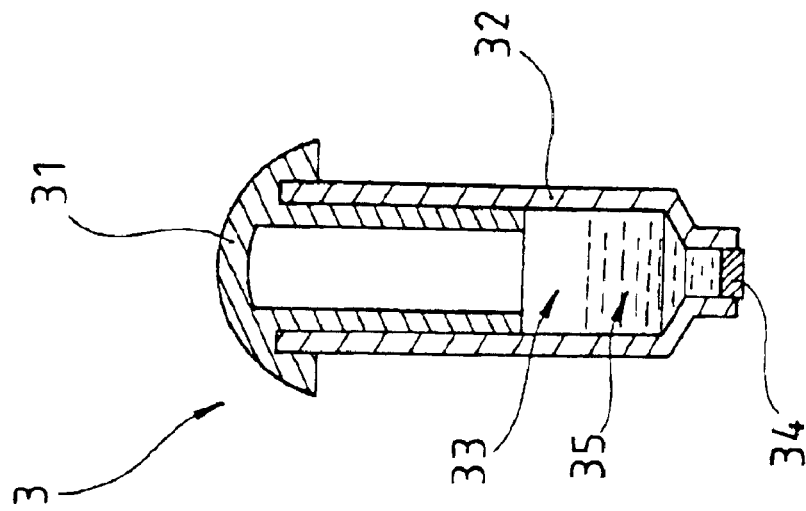
FIG. 4 is a cross-sectional drawing of the marking implement 3 of the invention herein.
Figure 3:
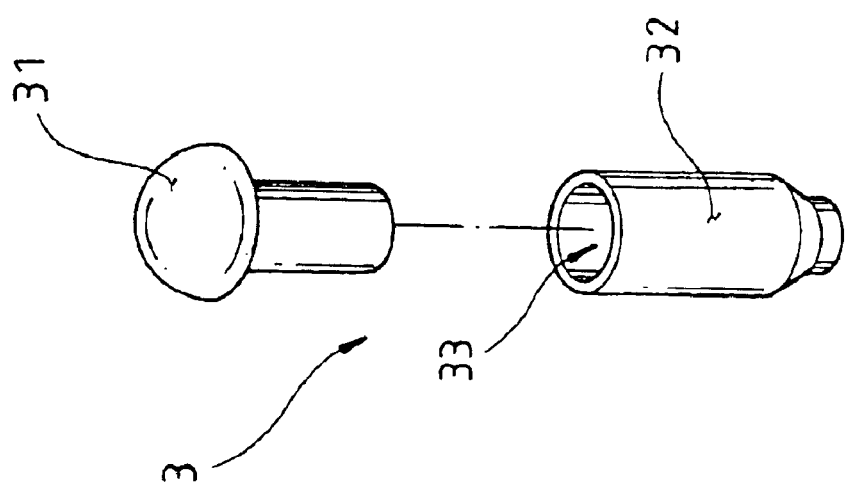
FIG. 3 is an exploded drawing of the marking implement 3 of the invention herein.

Referring to FIG. 1, FIG. 2, FIG. 3, and FIG. 4, the tape rule marking implement of the invention herein is comprised of a tape rule 1, a support member 2, a marking implement 3, and a carrier bracket 4, wherein the tape rule 1 has a threaded hole 11 in one side at the lower edge of the front end and an extendible measuring ruler blade 12 disposed in the front end; the said support member 2 is of one-piece plastic construction and has an axial hole 21 formed horizontally through the upper edge of the posterior extremity, a marking implement holding recess 22 formed transversely through the center, an arcuate slot 23 formed along the bottom edge, and a cylinder-shaped marking implement locating mount 24 on the corner at one side of the anterior extremity, the said marking implement locating mount 24 having a containment passage 25 formed vertically through the center and, furthermore, a plurality of horizontal slots 26 formed along the circumferential center of the locating mount 24, and the said support member 2 has a plurality of bumper cushions 27 attached to the lower edge of the anterior extremity. The marking implement of the 3 of the invention herein consists of a top cover 31 and a bottom seat 32; the said bottom seat 32 is of a cylindrical shape and has a containment passage 33 and a marking medium 34 is fitted into the underside of the said containment passage 33 and, furthermore, ink 35 is filled into the bottom seat 32 containment passage 33 such that the marking medium 34 absorbs the ink 35; additionally, the said marking medium 34 protrudes out slightly from the bottom seat 32. A bearing shaft 41 is horizontally disposed at the upper edge of the carrier bracket 4 and, furthermore, the carrier bracket 4 has an elongated hole 42 formed in one side of the rear end that accommodates a mounting screw 44 inserted through a fixing button 43 that is fastened to the threaded hole 11 in one side of the lower edge at the front end of the tape rule 1. The said marking implement 3 is inserted into the locating mount 24 containment passage 25 on the corner at one side of the anterior extremity of the marking implement 3, the arcuate slot 23 formed along the bottom edge of the said support member 2 is slipped over the tape rule 1 ruler blade 12, and the axial hole 21 formed horizontally through the upper edge at the posterior extremity of the support member 2 and the bearing shaft 41 horizontally disposed at the upper edge of the carrier bracket 4 are sleeved together, following which the mounting screw 45 and the bearing shaft 41 are fastened in place, enabling the assembly of the entire tape rule marking implement structure.

The marking implement support member 2 and carrier bracket 4 of the invention herein provide for assembly to the tape rule 1 by means of the threaded hole 11 in the lower edge at the front end of the tape rule 1; during the taking of measurements, when the user pulls out the ruler blade 12 to measure length and wants to designate a position, it is only necessary to press the marking implement to leave an indicatory spot; since the support member 2 is of one-piece plastic construction and, furthermore, has a cylinder-shaped marking implement locating mount 24 on the corner at the anterior extremity as well as a plurality of horizontal slots 26 formed along the circumferential center of the locating mount 24, when the user applies downward force to press the marking implement, the said marking implement moves downward such that the marking medium 34 at the underside delivers a dot. When the user releases the marking implement, the marking implement automatically returns to its original position, resulting in enhanced user measuring and marking convenience as well as higher product practical value.

In summation of the foregoing section, since the spatial arrangement of the invention herein is original, capable of greater utility, and possesses exceptionally practical value and, furthermore, an identical or similar product has not been observed on the market, the present invention is submitted to the examination committee for review and the granting of the commensurate patent rights.

What is claimed is:

1. A tape rule marking implement in which the said tape rule has a threaded hole in one side at the lower edge of the front end and an extendible measuring ruler blade disposed in the front end; the said support member is of one-piece plastic construction and has an axial hole formed horizontally through the upper edge of the posterior extremity, a marking implement holding recess formed transversely through the center, an arcuate slot formed along the bottom edge, and a cylinder-shaped marking implement locating mount on the corner at one side of the anterior extremity, the said marking implement locating mount having a containment passage formed vertically through the center and, furthermore, a plurality of horizontal slots formed along the circumferential center of the said locating mount, and the said support member has a plurality of bumper cushions attached to the lower edge of the anterior extremity; the marking implement of the invention herein consists of a top cover and a bottom seat; the said bottom seat is of a cylindrical shape and has a containment passage and a marking medium is fitted into the underside of the said containment passage and, furthermore, ink is filled into the said bottom seat containment passage such that the said marking medium absorbs the said ink; additionally, the said marking medium protrudes out slightly from the said bottom seat; a bearing shaft is horizontally disposed at the upper edge of the said carrier bracket and, furthermore, the said carrier bracket has an elongated hole formed in one side of the rear end that accommodates a mounting screw inserted through a fixing button that is fastened to the said threaded hole in one side of the lower edge at the front end of the said tape rule; the said marking implement is inserted into the said locating mount containment passage on the corner at one side of the anterior extremity of the said marking implement, the said arcuate slot formed along the bottom edge of the said support member is slipped over the said tape rule ruler blade, and the said axial hole formed horizontally through the upper edge at the posterior extremity of the said support member and the said bearing shaft horizontally disposed at the upper edge of the said carrier bracket are sleeved together, following which the said mounting screw and the said bearing shaft are fastened in place, enabling the assembly of the entire tape rule marking implement structure.

* * * * *